United States Patent [19]

Meckel et al.

[11] 4,071,505

[45] Jan. 31, 1978

[54] MOLECULAR WEIGHT CONTROL OF POLYURETHANE ELASTOMERS

[75] Inventors: Walter Meckel, Neuss, Germany; J. W. Britain, New Martinsville, W. Va.

[73] Assignees: Mobay Chemical Corporation, Pittsburgh, Pa.; Bayer Aktiengesellschaft, Leverkusen, Germany

[21] Appl. No.: 622,594

[22] Filed: Oct. 15, 1975

Related U.S. Application Data

[63] Continuation of Ser. No. 490,528, July 22, 1974, abandoned, which is a continuation-in-part of Ser. No. 417,988, Nov. 21, 1973, abandoned, which is a continuation of Ser. No. 252,642, May 12, 1972, abandoned.

[51] Int. Cl.$^2$ .............................................. C08G 18/30
[52] U.S. Cl. ........................ 260/77.5 MA; 260/75 NP
[58] Field of Search ................. 260/77.5 MA, 75 NE, 260/75 NP

[56] References Cited

U.S. PATENT DOCUMENTS

| | | | |
|---|---|---|---|
| 3,622,542 | 11/1971 | Klouman et al. | 260/77.5 AC |
| 3,718,622 | 2/1973 | Camilleri et al. | 260/77.5 MA |

*Primary Examiner*—H.S. Cockeram
*Attorney, Agent, or Firm*—Gene Harsh; Joseph C. Gil; William E. Parry

[57] ABSTRACT

Polyurethane elastomers are prepared by reacting organic polyisocyanates with organic polyhydroxyl compounds and a mono-functional secondary hydroxyl group containing chain terminator. The chain terminator can be added to the polyhydroxyl compound prior to the reaction with the polyisocyanate.

8 Claims, No Drawings

MOLECULAR WEIGHT CONTROL OF POLYURETHANE ELASTOMERS

This is a continuation, of application Ser. No. 490,528, filed July 22, 1974, and now abandoned, which application is a continuation in part of application Ser. No. 417,988, filed Nov. 21, 1973, and now abandoned, which in turn is a continuation of application Ser. No. 252,642, filed May 12, 1972, now abandoned.

This invention relates to polyurethane elastomers, the preparation thereof and more particularly to a means of controlling the molecular weight of polyurethane elastomers.

The production of polyurethane compositions by reacting organic polyisocyanates with organic compounds containing hydrogen atoms reactive with isocyanate groups is well known to the art. Polyurethane compositions so produced are employed in a variety of different applications such as, for example, in the production of molded articles, castings and the like. It is, however, difficult to consistently prepare reproducible products having uniform physical properties when polyurethanes are processed near the equivalence point, i.e., at an NCO/OH ratio of from about 0.90:1 to about 1.10:1. The variances in product reproducibility and uniformity are due to a number of possible reactions which depend upon difficult to control parameters.

One of the most important parameters is the NCO/OH ratio itself, which is controllable as a practical matter only within a range of about ±1%. A small change in the NCO/OH ratio results in a large change in rheological properties as measured by the intrinsic melt index or solution viscosity and the content of highly cross-linked particles. These undesirable changes are due to the reaction of the isocyanate groups with urethane groups to form allophanates rather than the normal chain lengthening reaction. Generally, the allophanate reaction, due to its low rate constant, is not detrimental, but near the equivalence point the reaction becomes of importance due to the relative scarcity of hydroxyl groups.

In order to produce a polyurethane composition of uniform quality and reproducibility, it is necessary to control the chain lengthening reaction so as to achieve the desired extent of polymerization or the desired molecular weight by minimizing the undesirable effects of allophanate formation.

The desirability of interrupting the polymerization reaction is suggested in U.S. Pat. No. 3,310,533 wherein the reaction is temporarily terminated by casting the reaction mixture and cooling to ambient temperature. It is also known to add a monoalcohol, for example, ethanol, to stop the polymerization reaction as taught in Canadian Pat. No. 888,781. Neither of these methods, however, is selective in minimizing allophanate formation.

It is therefore an object of this invention to provide a method of producing polyurethane compositions of uniform quality and reproducibility. It is another object of this invention to provide a method of producing polyurethane compositions of uniform molecular weight. It is a further object of this invention to provide a means of controlling the polymerization reaction so as to achieve the desired extent of polymerization or to obtain the desired molecular weight. Yet another object of this invention is to provide polyurethane compositions of uniform quality and reproducibility. Still another object of this invention is to provide polyurethane compositions having uniform rheological properties.

The foregoing objects and others, which will become apparent from the following description, are accomplished in accordance with the invention, generally speaking, by minimizing the allophanate producing reaction between a polyisocyanate and urethane groups at or near the equivalence point by incorporating into the reaction mixture a chain terminator compound having the formula:

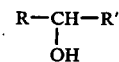

wherein R and R' are the same or different and represent alkyl groups containing at least 3 carbon atoms which may be branched in either the $\alpha$- or $\beta$-positions, which may also contain hetero atoms and which contain no substituents reactive with NCO groups.

The chain terminators of the invention are monofunctional, secondary hydroxyl compounds wherein the hydroxyl group is sterically hindered and are significantly more selective than the monofunctional alcohols of the prior art. The increased selectivity of the chain terminators of the invention is due largely to the following properties:

1. The reactivity of the secondary hydroxyl group is lower than the activity of primary hydroxyl groups thus allowing an undisturbed chain-lengthening reaction while assuring availability of the chain terminator at the end of the reaction.

2. The reactivity of the chain terminators of the invention is higher than that of urethane groups toward isocyanate groups, thus minimizing the extent of allophanate formation.

3. The boiling point of the chain terminators of the invention is sufficiently high to prevent its easy evaporation from the reaction mixture.

Due to equipment limitations, inaccuracy of metering the components and the like, variations in NCO/OH ratio will always be present and depending upon the desired viscosity of the final product some fluctuation in the NCO/OH ratio can be tolerated. However, as the equivalence point is approached, the tendency toward allophanate formation is enhanced resulting in increased viscosity due to excessive cross-linking rather than normal extension. Due to the properties of the chain terminator compounds of the invention, they become increasingly reactive toward —NCO groups as the polymerization reaction proceeds to the equivalence point, thus minimizing allophanate formation and assuring a polyurethane product of uniform quality which is more easily reproducible.

The chain terminator is added to the reaction mixture prior to final reaction of polyhydroxyl and polyisocyanate compounds to form the polyurethane elastomer. Generally, the chain terminator is added to a hydroxyl group containing compound, e.g. the polyester or polyether polyol or a polyhydroxyl chain extender, prior to reaction with the polyisocyanate. Thus, for example, an excess of a polyisocyanate can be reacted with a polyhydroxyl compound in order to form an isocyanate-terminated prepolymer, after which the prepolymer can be reacted with a polyhydroxyl chain extender. In such situation, the chain terminator can be added to the polyhydroxyl chain extender prior to its reaction with the isocyanate-terminated prepolymer. Alternatively, for example, the polyurethane elastomer can be produced by reacting a polyiscyanate compound with a polyhydroxyl compound (either with or without a chain extender) substantially in a one-shot type operation and, in such instance, the chain terminator would be added to the polyhydroxyl compound prior to admixture with the polyisocyanate. Thus, the chain terminator is present in the reaction mixture throughout the polyurethane forming reaction, and is not merely added to the reaction mixture in order to stop the reaction when the desired degree of polymerization has been reached as is the case with chain terminators of the prior art.

The amount of chain terminator employed is a function of the hydroxyl groups available for the polyurethane forming reaction. The chain terminator is used in an amount of from about 0.1 percent to about 3 percent based on the molecular equivalent of all available hydroxyl groups and is most preferably used in an amount of from about 0.2 percent to about 2 percent.

The chain terminators employed in the invention can be any materials having the formula described above, such as, materials comprised completely of carbon and hydrogen atoms with the single exception of the one hydroxyl group as well as compounds containing heteroatoms, i.e. atoms other than carbon and hydrogen, such as, for example, halogen substituted compounds. Additionally, heteroatom containing compounds such as, esters and ethers are also suitable. Compounds of this nature are well known and are either readily obtainable commercially or easily synthesized by those skilled in the art. Although it is not necessary for there to be structural symmetry about the OH group, i.e. both R and R' are the same, and compounds such as 2,6,8-trimethylnonanol-4 and 2,4,8-trimethyl-2,4,8-trichloro-6-nonanol are quite satisfactory, we prefer, however, to employ chain terminators in which R and R' are the same, when R and R' contain heteroatoms in the form of ether or ester groups, and particularly ester groups. Illustrative of such materials are 4-heptanol-2,6-diacetate or 2,6-dimethyl-4-heptanol-2,6-diacetate. These materials can be described as diesters obtained, for example, by the reaction of a carboxylic acid with a triol.

Other suitable compounds which can be employed as chain terminators in the invention are diisobutyl carbinol, diisopropyl carbinol, 2,6-dibromo-4-heptanol, 2,6-dimethyl-2,6-dichloro-4-heptanol and the like. Generally, however, we prefer to employ chain terminators free of hetero atoms. It will be seen, therefore, that the primary requirement for the chain terminators of this invention is that the compounds contain a secondary hydroxyl group and be of sufficient high molecular weight, so as not to be vaporized during the course of the urethane forming reaction. Any further stearic hinderance resulting from R and R' being branched represents a further advantage in that particular compound.

Suitable starting materials for the production of elastomeric polyurethanes according to the invention include those organic compounds which contain at least two hydroxyl groups and have a molecular weight of from about 800 to about 5,000, preferably a molecular weight of from about 1,000 to about 3,000.

Any suitable hydroxyl polyester may be used such as linear or slightly branched polyesters obtained, for example, from oxycarboxylic acid or carboxylic acids and mono- or polyhydric alcohols optionally with aminoalcohols, diamines, oxyamines and diamino alcohols. Any suitable polycarboxylic acid may be used such as, for example, oxalic acid, malonic acid, succinic acid, glutaric acid, adipic acid, pimelic acid, suberic acid, azelaic acid, brassylic acid, sebacic acid, thapsic acid, maleic acid, fumaric acid, glutaconic acid, diethylsuccinic acid, isophthalic acid, terephthalic acid, 1,4-cyclohexanedicarboxylic acid, and the like as well as hydroxy carboxylic acid. Any suitable primary hydroxylic polyhydric alcohol may be used such as, for example, ethylene glycol, diethylene glycol, triethylene glycol, 1,3-propylene glycol, 1,2-butylene glycol, 1,4-butylene glycol, 1,5-pentane diol, 1,6-hexane diol, 1,7-heptane diol and the like. The polyesters may contain double or triple bonds in unsaturated fatty acid moieties.

Any suitable linear or slightly branched polyether, such as a polyhydric polyalkylene ether may be used, such as, for example, the condensation product of an alkylene oxide optionally with any suitable initiator. The initiator may be difunctional compounds including water so that the resulting polyether is essentially a chain of repeating alkylene oxy groups as in polyethylene ether glycol, poly 1,4-butylene ether glycol and the like; or the initiator may be any suitable active hydrogen containing compound which may be a monomer or even a compound having a relatively high molecular weight including other active hydrogen containing compounds as disclosed above. It is preferred that the initiator has 2 active sites to which the alkylene oxides may add including, for example, amines, polyfunctional alcohols, aminoalcohols and the like. Any suitable alkylene oxide may be used such as, for example, ethylene oxide, tetrahydrofuran and epihalohydrins. Copolymers of this type may also be used. Any suitable initiator may be used including, for example, water, polyhydric alcohols, preferably having 2 hydroxyl groups, aminoalcohols, amines preferably having 2 replaceable hydrogen atoms bonded to nitrogen atoms.

There are many desirable processes for the preparation of polyhydric polyalkylene ethers including U.S. Pat. Nos. 1,922,459; 3,009,939 and 3,061,625 or by the process disclosed by Wurtz in 1859 and in Encyclopedia of Chemical Technology, Volume 7, pages 257 to 262, published by Interscience Publishers, Inc. (1951). Specific examples of difunctional initiators (i.e., those having two active hydrogen atoms) are water, ethylene glycol, aniline, diethylene glycol, hexane-1,6-diol, N-methyl diethanolamine and the like.

Specific examples of difunctional initiators (i.e., those having two active hydrogen atoms) are water, ethylene glycol, aniline, diethylene glycol, hexane-1,6diol, N-methyl diethanolamine and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters. Also, any suitable polycarbonates may be employed if desired. It is also possible to employ mixtures of various organic compounds having at least two hydroxyl groups and a molecular weight of from about 800 to about 5,000.

Any suitable organic diisocyanate may be used in the process of the present invention including aromatic, aliphatic and heterocyclic diisocyanates. In other words, two isocyanate radicals may be bonded to any suitable divalent organic radical to produce the organic diisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, 1,4-butane diisocyanate, 1,6-hexane diisocyanate, 1,8-octamethylene diisocyanate, cyclohexylene-1,2-diisocyanate, m-phenylene diisocyanate, 2,4-toluylene diisocyanate, 2,6-tolulylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'biphenylene diisocyanate, 3,3'dichloro-4,4'-biphenylene diisocyanate, 1,5-naphthalene diisocyanate, furfurylidene diisocyanate and the like.

Examples of preferred diisocyanates include aliphatic diisocyanates, having the general formula:

OCN—(CH$_2$)$_n$—NCO wherein $n$ represents a number from 2 to 8; cycloaliphatic diisocyanates, such as hexahydrotolylene-2,4- and 2,6-diisocyanate and mixtures of the isomers, 4,4'dicyclohexyl methane diisocyanate, 1,4-diisocyanato cyclohexane, 1,3-diisocyanato cyclohexane, araliphatic diisocyanates such as 1,3- and 1,4-xylylene diisocyanate, and aromatic diisocyanates such as tolylene-2,4 or 2,6-diisocyanate and mixtures of these isomers such as a mixture of 80% 2,4-toluylene diisocyanate and 20% 2,6-toluylene diisocyanate, phenylene-1,4-diisocyanate, phenylene-1,3-diisocyanate diphenylmethane-4,4'diisocyanate, diphenyl ether 4,4'-diisocyanate, naphthylene-1,5-diisocyanate and the like. Isophorone diisocyanate and ester diisocyanates of carboxylic acids of the kind described, for example, in British Pat. Specifications Nos. 965,474 and 1,072,956 may also be used as diisocyanates in accordance with the invention. Proportions of triisocyanates such as, benzene-1,3,5-triisocyanate or p,p',p"-triphenyl methane triisocyanate and the like may be used. Most preferred isocyanates are p-phenylene diisocyanate, diphenylmethane-4,4'-diisocyanate and naphthylene-1,5- diisocyanate.

In addition to polyols which contain primary hydroxyl groups, it is also possible to use polyols which contain secondary hydroxyl groups, provided they are used in the form of prepolymers. Some examples of compounds containing secondary hydroxyl groups are 1,2-propylene glycol, 1,3-butylene glycol, 1,3-pentane diol, 1,4-pentane diol and the like. The most preferred prepolymers of secondary hydroxyl group containing compounds are prepared from propylene glycol and diphenyl methane diisocyanate and polyesters containing secondary hydroxyl groups with diphenyl methane diisocyanate.

When preparing polyurethanes in accordance with this invention various chain extenders can be employed. Generally, these materials are in the form of diols having a molecular weight which is comparatively low relative to the polyols described previously and are in addition to the polyols described immediately above for use in preparation of prepolymers. As a general rule, these chain extenders will have molecular weights in the range of about 62 to about 400 and preferably will have molecular weights of less than about 200 and even less than about 175. Illustrative of this type of chain extender are primary hydroxyl containing diols such as, ethylene glycol, propylene glycol, 1,4-butane diol and 1,6-hexane diol.

Generally, the quantities in which the reactants are used are selected in such a way that the molar ratio of diisocyanate to chain extender plus the compound containing reactive hydroxyl groups, which is governed by the particular processing method used, is generally from 0.9 to 1.1 and preferably 0.95 to 1.05.

The polyurethanes produced by the process of the invention are particularly useful in the production of lacquers, coatings and the like in which applications would be dissolved in inert solvents and applied to suitable substrate by brushing, spraying, rolling and the like. In addition, the polyurethanes produced by the process of the invention are also of interest in the production of molded articles by injection molding, blow molding or extrusion techniques, which latter applications require that the rheological properties of different material batches be as uniform as possible.

The invention is further illustrated by the following examples in which all parts and percentages are by weight unless otherwise indicated.

EXAMPLES

EXAMPLE 1

1a. A polyol mixture of about 100 parts of polybutylene-1,4-adipate (hydroxyl number, about 56), about 7.5 parts of 1,4-butane diol plus about 0.35 part of diisobutylcarbinol are reacted with 4,4'-diisocyanatodiphenylmethane at a temperature of from about 90° C to about 140° C. The mixture is stirred for about 30 seconds, cast in a preheated mold, cured for about 10 minutes, ground and aged for about 78 hours at about 80° C.

About 75 parts of the aged material are dissolved in about 225 parts of a mixture of about 3 parts by volume dimethylformamide and about 2 parts by volume methylethylketone.

The solution viscosity as a function of NCO/OH ratio is measured at 25° C with a Brookfield Viscometer, Type LVF, Spindle No. 4 at 30 rpm.

1b. The same procedure is followed as in Example 1a except that about 0.43 part of 2,6,8-trimethylnonanol-4 is used in place of the diisobutylcarbinol.

1c. The same procedure is followed as in Example 1a except that no chain terminator is added.

1d. The same procedure is followed as in Example 1a except that about 0.32 part of 2-ethylhexanol is used in place of the diisobutylcarbinol.

The increase in solution viscosity as a function of NCO/OH ratio as the equivalence point is approached is measured and summarized in the following Table for the polyol solutions of Example 1a to d.

TABLE 1

| EXAMPLE | NCO/OH RATIO | VISCOSITY, cps | RANGE* |
|---------|--------------|----------------|--------|
| 1a | 0.965 | 4,600 | 4.5% |
| | 0.969 | 6,100 | |
| | 0.981 | 7,190 | |
| | 0.992 | 9,650 | |
| 1b | 0.970 | 4,200 | 3.9% |
| | 0.985 | 6,300 | |
| | 0.997 | 8,900 | |
| | 1.013 | 13,500 | |
| 1c | 0.969 | 2,400 | 1.4% |
| | 0.982 | 11,200 | |
| | 0.992 | 20,500 | |

TABLE 1-continued

| EXAMPLE | NCO/OH RATIO | VISCOSITY, cps | RANGE* |
|---------|--------------|----------------|--------|
|         | 1.013        | 55,200         |        |
| 1d      | 0.965        | 1,100          | 2.0%   |
|         | 0.985        | 3,000          |        |
|         | 1.005        | 8,200          |        |
|         | 1.016        | 15,600         |        |

*The range is defined as the percent of allowable variation or fluctuation in the NCO/OH ratio which would yield solutions in a workable viscosity range, i.e. from about 5,000 to about 15,000 cps at 25° C.

As is clearly shown in the above Table, a considerably wider range of allowable NCO/OH fluctuation can be tolerated in polyol solutions prepared using the chain terminator of the invention (Examples 1a and 1b) nor does the viscosity increase as rapidly as the equivalence point is neared as compared to a composition to which no chain terminator is added (Example 1c) or to a composition to which a non-sterically hindered, primary monohydric alcohol is added (Example 1d).

EXAMPLE 2

2a. A polyol mixture of about 100 parts of polybutylene-1,4-adipate (hydroxyl number, about 56), about 1.8 parts of 1,4butane diol and about 0.2 part of diisobutylcarbinol are reacted with 4,4'-diisocyanato diphenyl methane at a temperature of from about 90° C to about 140° C. The mixture is stirred for about 60 seconds, cast in a pre-heated mold, cured for about 10 minutes at about 110° C, ground and aged for about 72 hours at about 80° C.

About 30 parts of the aged material are dissolved in about 170 parts of methyl ethyl ketone. The solution viscosity is measured at 25° C with a Brookfield-Viscometer, Type LVF, Spindle No. 3 from 6 to 12 rpm.

2b. The same procedure is followed as in Example 2a except that no chain terminator is added.

2c. The same procedure is followed as in Example 2a except that about 0.18 part of 2 ethyl hexanol is used in place of the diisobutylcarbinol.

The increase in solution viscosity as a function of NCO/OH ratio as the equivalence point is approached is measured and summarized in the following Table for the polyol solutions of Example 2a to c.

TABLE 2

| EXAMPLE | NCO/OH RATIO | VISCOSITY, cps | RANGE* |
|---------|--------------|----------------|--------|
| 2a      | 0.957        | 130            | 1.2%   |
|         | 0.978        | 550            |        |
|         | 0.996        | 1,190          |        |
| 2b      | 0.963        | 300            | 0.6%   |
|         | 0.978        | 1,000          |        |
|         | 0.998        | 4,500          |        |
| 2c      | 0.958        | 140            | 0.7%   |
|         | 0.979        | 350            |        |
|         | 0.998        | 1,230          |        |

*The range is defined as the percent of allowable variation of fluctuation in the NCO/OH ratio which will yield solutions in a workable viscosity range, i.e., from about 750 to about 1,200 cps at 25° C.

Once again the above data clearly indicates that when using the chain terminators according to the process of the invention (Example 2a) a wider fluctuation in NCO/OH ratio can be tolerated and a slower increase in viscosity results than those obtained when no chain terminator is employed (Example 2b) or when a monofunctional alcohol is used (Example 2c).

EXAMPLE 3

3. A polyol mixture of about 100 parts of polybutylene-1,4-adipate (hydroxyl number, 56), about 9.5 parts of 1,4-butane diol and about 0.6 part of 2,6,8-trimethylnonanol-4 are reacted with about 41.5 parts of 4,4'-diisocyanato diphenyl methane such that the NCO to OH ratio is about 1.05 to 1. The mixture is stirred at a temperature of from about 90° C to about 40° C for about 30 seconds, cast in a preheated mold, cured for about 10 minutes, ground, extruded and pelletized.

The material thus produced is particularly suited for injection molding as the injection molding machine can be operated; using this material, over a broad temperature range.

The physical properties of molded products after about 16 hours heat treatment at about 110° C are as follows:

| Ultimate Tensile Strength | 8,100 psi |
| Elongation at Break | 510% |
| Set, 10 Minutes After Break | 15% |
| Tear Strength | 410 pli |
| Shore-Hardness, A | 86 |

EXAMPLE 4

A polyurethane elastomeric adhesive which is soluble in ethylacetate is prepared by reacting about 2,000 parts by weight of a polyester made from ethylene glycol and adipic acid, and having an OH number of about 56, an acid number of about 1.1 and a water content of about 0.01% with about 176 parts by weight of (80/20) toluene diisocyanate. Prior to mixing the polyester with the diisocyanate, about 1.5 parts by weight of diisobutylcarbinol is added to the polyester. This reaction mixture is heated to about 130° C and stirred until it becomes thickened to the extent that mixing is starting to become difficult. The thickened reaction mixture is then poured into a tray and heated in an oven for at least about 16 hours at 110° C in order to insure thorough reaction of the mass. Thereafter, the product is cooled and allowed to stand cold until crystallized, after which it is chopped into a suitable form for use. The product produced by the technique of this example is soluble in ethylacetate and other well known solvents and can be used as an adhesive.

Without the use of the chain terminator (the diisobutylcarbinol) it is difficult to produce a soluble product with a reasonably reproducible viscosity.

Cross linking of the adhesive solution of this example can be accomplished by the use of diepoxides or other suitable cross linking agents.

EXAMPLE 5

In this example, a polyol mixture of about 100 parts by weight of polybutylene-1,4-adipate (hydroxyl number 56), about 6.5 parts by weight of 1,4-butanediol and about 2.1 parts by weight of ethyleneglycol together with about 0.6 parts by weight of 2,6,8-trimethylnonanol-4 are reacted with about 42 parts by weight of 4,4'-diisocyanatodiphenylmethane. This reaction mixture has an NCO to OH ratio of about 1.06 to 1. The mixture is stirred at a temperature of about 120° C for about 30 seconds, after which it is cast into a preheated tray at about 130° C and cured for about 10 minutes at about 130° C. After curing the product is demolded, ground, extruded and pelletized.

The material produced in this example is particularly suited for injection molding and the material so produced gives more reproducible physical properties over a wider NCO/OH ratio than are obtainable without the chain terminator compound (2,6,8-trimethylnonanol-4).

EXAMPLE 6

A polyol mixture of about 100 parts by weight of polybutylene-1,4-adipate (hydroxyl number 54), about 8.5 parts by weight of 1,6-hexanediol, about 13.6 parts by weight of a 400 average molecular weight condensate of approximately 3 mols of propylene oxide per mol of propylene glycol and about 4 mols of ethylene oxide on this reaction product, together with about 0.6 parts by weight of 2,6,8-trimethylnonanol-4 are reacted with about 42 parts by weight of 4,4-diisocyanatodiphenylmethane such that the NCO/OH ratio is about 1.06 to 1. This mixture is stirred at a temperature of about 110° C for about 30 seconds, after which it is cast into a preheated tray at about 110° C and cured for about 20 minutes at 110° C. After the product is removed from the mold, it is ground, extruded and pelletized.

The material produced in this example is particularly suited for injection molding and can be molded over a wider range of temperature than if the chain terminator (2,6,8-trimethylnonanol-4), is not used.

Although the invention is described in considerable detail in the foregoing Examples, it is to be understood that such Examples are presented solely for purposes of illustration and it is not intended that the invention be so limited as one skilled in the art may make many variations therein without departing from the spirit and scope of the invention.

What is claimed is:

1. A process for producing elastomeric polyurethanes comprising reacting organic polyisocyanates with organic polyhydroxyl compounds having a molecular weight of from about 800 to about 5,000, containing at least two OH groups reactive with NCO groups such that the NCO/OH ratio is from about 0.9:1 to about 1.1:1 and incorporating into the reaction mixture a chain terminator having the general formula:

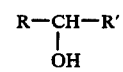

wherein R and R' are the same or different and represent alkyl groups containing at least 3 carbon atoms which may be branched in the α- or β-positions, which may be substituted with halogen atoms, and which may contain hetero atoms in the form of esters or ethers, and wherein the chain terminator is present in an amount from about 0.1 percent to about 3 percent based on the molecular equivalent of all available OH groups.

2. The process of claim 1 wherein the NCO/OH ratio is from about 0.95:1 to about 1.05:1.

3. The process of claim 1 wherein from about 0.2 to about 2 percent of chain terminator based on the molecular equivalent of all available OH groups is incorporated.

4. The process of claim 1 wherein the chain terminator is diisobutylcarbinol.

5. The process of claim 1 wherein the chain terminator is diisopropylcarbinol.

6. The process of claim 1 wherein the chain terminator is 2,6,8-trimethylnonanol-4.

7. The process of claim 1 wherein the reactor mixture also contains a chain extender in the form of a diol having a molecular weight in the range from about 62 to about 400.

8. A polyurethane elastomer prepared by the process of claim 1.

* * * * *